March 24, 1953 D. O. HUNTER 2,632,864
TELEVISION SYSTEM
Filed June 25, 1952

INVENTOR.
Daniel O. Hunter
BY [signature]
ATTORNEY

UNITED STATES PATENT OFFICE 2,632,864

TELEVISION SYSTEM

Daniel O. Hunter, Princeton, N. J., assignor to Radio Corporation of America, a corporation of Delaware Application June 25, 1952, Serial No. 295,481

9 Claims. (Cl. 315—24)

This invention relates to improvements in television image transmission, and more particularly to improvements in apparatus associated with television camera tubes, or the like.

The image orthicon television camera pickup tube has been widely accepted as a desirable means for translating light images into electrical signals suitable for television transmission. A good description and an explanation of the operation of an image orthicon may be found in an article entitled "The image orthicon—a sensitive television pickup tube," by Albert Rose, Paul K. Weimer, and Harold B. Law, appearing in the July 1946 issue of the "Proceedings of The Institute of Radio Engineers."

One difficulty encountered in the use of image orthicons, however, has been the tendency for an image to impress itself semi-permanently on the target screen when a quiescent scene or image has been focused thereon for a period of time. This effect has been frequently referred to as "burning" or "sticking." In practice, the operators of television cameras using image orthicon camera tubes have been obliged to keep the cameras in motion to avoid this effect.

In certain applications of image orthicons, special purpose gratings and/or lenses having geometric configurations have been placed in the optical path or inside the tube in the electron path between the photocathode and target. As a result of the interposition of such a lens or grating, shadows or patterns may appear on the target. As in the case where the image orthicon is directed toward a quiescent scene, these shadows or patterns may tend to become semi-permanently impressed upon the target.

It is an object of this invention to provide means for minimizing the adverse effects encountered at the target of an image orthicon when a quiescent scene appears thereon.

It is another object of this invention to impart a slight movement to the electron image appearing at the target of an image orthicon camera tube.

According to the present invention, one or more coils are placed adjacent to the image section of an image orthicon to provide a variable magnetic field for displacing the electron image at the target of the image orthicon.

Other and incidental objects of this invention will become apparent upon a reading of the following specification and an inspection of the drawing in which.

Figure 1:
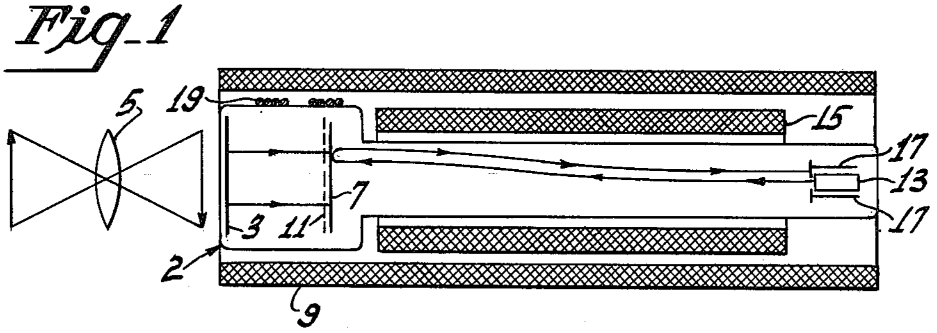
Figure 1 is a diagrammatic showing of an image orthicon camera tube with associated deflection and focusing coils, and including an illustrative embodiment of the present invention.

Referring to the drawing in detail, reference will first be made to Figure 1, where a simplified sectional view of an image orthicon 2 is shown. An image to be televised may be focused on the photocathode 3 by means of a lens 5. Photoelectrons emitted as a result of the impression of an image on the photocathode 3 are accelerated from the photocathode 3 towards the target 7 by an electric field produced by suitable potentials being applied to the photocathode 3 and the target 7, and a magnetic field produced by a focusing coil 9 focuses this electron image on the target 7. Secondary electrons occurring as a result of the photoelectrons striking the target 7 are collected by a target screen 11. This leaves a charged pattern on the target 7 corresponding to the original light image focused on the photocathode 3. That portion of the image orthicon camera tube including the photocathode, target, and target screen, is commonly known as the image section. A stream of electrons from the cathode 13 is focused on the target 7 by a magnetic field produced by the focusing coil 9 and may be deflected across the target 7 to scan the surface of the target 7 by the deflection coil 15. When the electron beam from the cathode 13 strikes a portion of the target 7 where there is no positive charge, substantially all of the electrons are reflected and returned toward the gun approximately along the initial path. However, if there is a positive charge pattern on the target, the electrons are deposited in sufficient numbers to neutralize the positive charge and the remaining electrons are reflected. In this way, a stream of electrons amplitude modulated by the charge pattern is returned to a collector electrode 17. Additional information on the operation of the image orthicon may be found in "The image orthicon—a sensitive television pickup tube," supra.

It has been found, that when a scene focused on the photocathode 3 is quiescent in nature, or when a grating or lens is interposed, the target will not immediately recover when the quiescent image is removed. When viewing the result of this effect on a television monitor or on a home television receiver, the outline of images appearing during the quiescent interval will be seen to remain even when the camera is directed toward another scene.

A magnetic field produced by a current through a coil 19 sets up a magnetic field perpendicular to the axis of the image orthicon 2. This magnetic field tends to alter the path of the photoelectrons from the photocathode 3 in their path toward the target 7. By varying the current through the coil 19 a linear motion may be imparted to the electron image formed at the target 7. By moving the image on the target 7, the effects of "burning" are minimized even though a quiescent image is focused on the photocathode 3 and even though a lens or grating is interposed.

Figure 2:
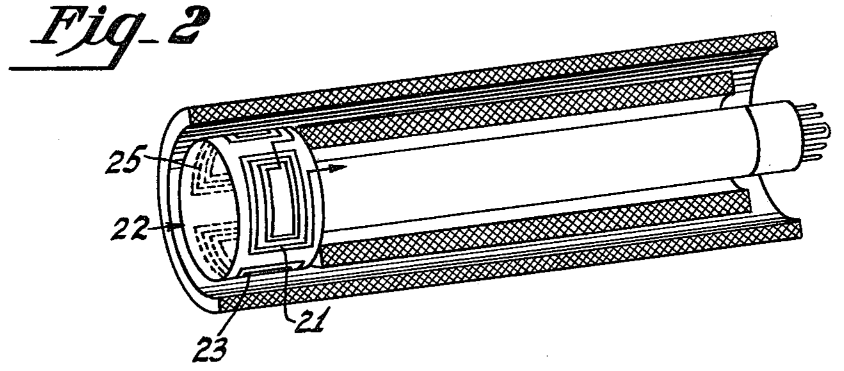
Figure 2 is a perspective view of an image orthicon camera tube with associated deflection and focusing coils partially cut away to more clearly show an illustrative embodiment of the present invention.
Figure 3:
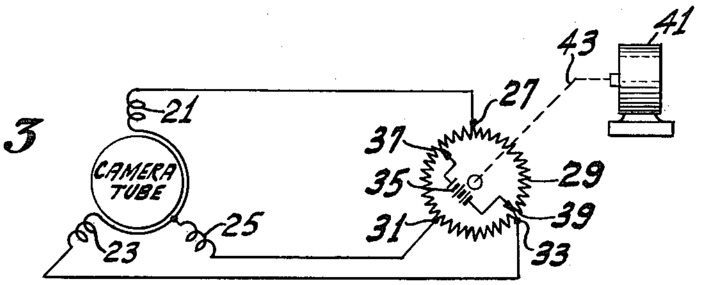
Figure 3 is a schematic diagram of the circuit connections for one embodiment of the present invention.

While one coil might be used to displace the electron image to advantage, it has been found desirable to employ more than one coil placed radially around the image section of the image orthicon. Thus, Figure 2 shows an illustrative embodiment of the present invention where three coils 21, 23, and 25 are placed radially around the image section of an image orthicon 22. These three coils 21, 23, and 25 may be connected as shown in Figure 3. One end of the coil 21 is connected to a common connection between the coils 23 and 25, and the other end of the coil 21 is connected to a tap 27 on one end of a potentiometer 29. The other end of the coil 25 may be connected to a tap 31, and in like manner the other end of the coil 23 may be connected to a tap 33 on the potentiometer 29. To provide means for varying the current through the coils 21, 23, and 25, a source of potential 35 may be connected between two slidable contacts 37 and 39 of the potentiometer 29. The slidable contacts may be rotated to vary the current through the coils 21, 23, and 25 by some suitable means, such as for example, a motor 41. Dashed line 43 represents a mechanical linkage between the motor 41 and slidable contacts 37 and 39. By employing the illustrative embodiment of Figures 2 and 3 a circular motion may be imparted to the electron image at the target 7. In addition, the use of three coils provides a more uniform magnetic field across the image section of the image orthicon.

Figure 4:
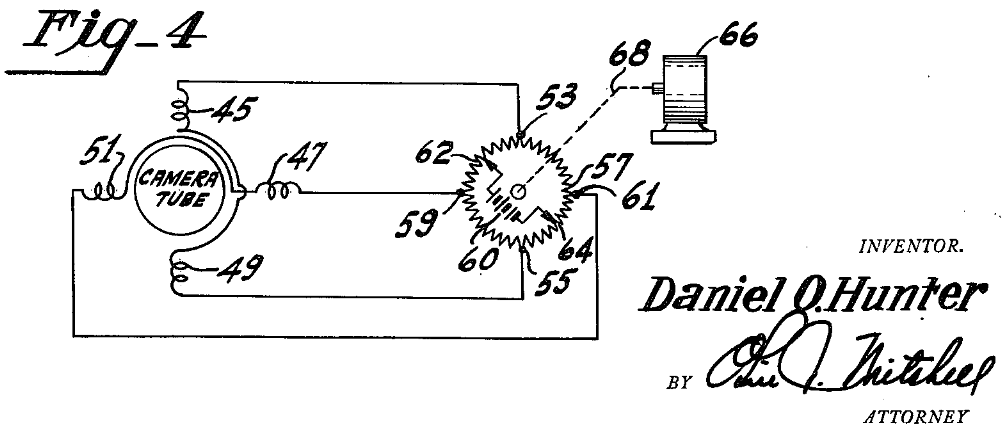
Figure 4 is a schematic diagram of the circuit connections for another embodiment of the present invention.

Figure 4 shows an illustrative embodiment of the present invention where four coils 45, 47, 49, and 51 have been used. The coils 45 and 49 are connected in series so that their respective magnetic fields aid one another, and the series combination is connected between the taps 53 and 55 on the potentiometer 57. In like manner, coils 51 and 47 are connected in series between the taps 59 and 61 on the potentiometer 57. A source of potential 60 is connected between two slidable contacts 62 and 64 which are adapted to be rotated by means of the motor 66 which is mechanically linked to the slidable contacts by some suitable means diagrammatically shown by the dashed line 68.

Rotation of the potentiometers 29 and 57 of Figures 3 and 4, respectively, will result in a circular motion being imparted to the electron image at the target 7. While a potentiometer having rotating slidable contacts thereon has been shown as a means for varying the current through the coils in the illustrative embodiments, it will be apparent that the means for varying the current through the various coils is not limited to such apparatus. Nor is the invention limited to any specific number of coils. One or more might be employed, although it has been found desirable to use either the arrangement of Figure 3 or of Figure 4. It will be noted that the coils shown in Figure 2 are wound to form what is known as a flat rectangular type or "pancake" type coil. Information on the design of flat rectangular type coils may be found in the Radio Engineers Handbook, by F. E. Termon, first edition, at page 59. This construction was utilized to allow the coils to be placed around the image section of an image orthicon within the space allowed by a conventional focusing coil. Where such space is not limited, other types of coils might be employed, or a special section of the focusing coil might be devoted to suitable auxiliary windings. Using the arrangement of Figure 4, it has been found that twenty turns in each of coils 45, 47, 49, and 51, and 500 ma. maximum current through the various coils, resulted in a .01 inch displacement of the image on the target.

Where the principles of the present invention are employed in a conventional television system, the amount of image displacement and the rate of cyclical movement may be made quite small in order that the effects of the image displacement on the television receiving apparatus will not be objectionable. In other applications, however, where large amounts of displacement and/or higher rates of cyclical variation are employed, suitable means may be utilized in either the television transmission system or the television receiving apparatus to compensate for the movement if desired.

From the foregoing description, and the application of the principles taught by the present invention, apparatus is provided for displacement of an electron image on the target of an image orthicon camera tube. Such apparatus may be used to advantage in television system to minimize "burning" of the image on the target, as well as for other applications where it is desired to change the position of an electron image on the target of an image orthicon camera tube.

What is claimed is:

1. Apparatus including the combination of, an image orthicon camera tube, said image orthicon camera tube including an image section, means providing a magnetic field associated with the image section of said image orthicon camera tube, said magnetic field providing means adapted to produce a varying magnetic field across said image section whereby the electron image on the target of said image orthicon camera tube may be cyclically displaced.

2. Apparatus including the combination of, an image orthicon camera tube, said image orthicon camera tube including an image section, at least one coil mounted adjacent to said image section whereby a magnetic field is set up across said image section, and current varying means connected to said coil, whereby the electron image in the image section of said image orthicon camera tube may be cyclically displaced.

3. Apparatus including the combination of, an electron tube having an image section, a plurality of coils mounted radially around said image section, and means for continuously varying the current in said coils, whereby the electron image in the image section of said electron tube may be cyclically displaced.

4. Apparatus including the combination of, an image orthicon tube having an image section, said image section including a photocathode and a target, said photocathode adapted to provide an electron image on said target, and means continuously varying the position of said electron image on said target.

5. Apparatus including the combination of, an image orthicon camera tube including an image section, said image section having a photocathode and a target, said photocathode adapted to provide an electron image on said target, a plurality of coils mounted radially around the axis of said image orthicon camera tube adjacent to said image section of said image orthicon camera tube, and current varying means connected to said plurality of coils whereby the electron image on the target of said image orthicon camera tube may be cyclically displaced.

6. Apparatus including the combination of, an electron tube having an image section, a plurality of coils associated with said image section, said plurality of coils being positioned with respect to said image section to provide a magnetic field across said image section, and current varying means connected to said plurality of coils, whereby the electron image in the image section of said electron tube may be cyclically displaced.

7. Apparatus including the combination of, an electron tube having an image section and plurality of coils associated with said image section, said plurality of coils being positioned with their magnetic axes perpendicular to the axis of said electron tube, and current varying means connected to said plurality of coils whereby the electron image in the image section of said electron tube may be cyclically displaced.

8. Apparatus including the combination of, a plurality of coils, said plurality of coils adapted to be positioned radially around the image section of an image orthicon camera tube, and current varying means connected to said plurality of coils whereby the magnetic field produced by said plurality of coils is varied to provide a cyclical displacement of the electron image in the image section of said image orthicon camera tube.

9. Apparatus including the combination of, an image orthicon camera tube having an image section, and means providing a continuously variable magnetic field perpendicular to the axis of said image orthicon camera tube across the image section of said image orthicon camera tube whereby the electron image in the image section of said image orthicon camera tube may be cyclically displaced.

DANIEL O. HUNTER.

REFERENCES CITED

The following references are of record in the file of this patent:

FOREIGN PATENTS

| Number | Country | Date |
|---|---|---|
| 628,745 | Great Britain | Sept. 5, 1949 |